United States Patent
Okada et al.

(10) Patent No.: US 11,400,724 B2
(45) Date of Patent: Aug. 2, 2022

(54) INK RECEPTACLE

(71) Applicant: Seiko Epson Corporation, Tokyo (JP)

(72) Inventors: Hideki Okada, Shiojiri (JP); Kosuke Chidate, Shiojiri (JP); Tasuku Nakamura, Matsumoto (JP)

(73) Assignee: Seiko Epson Corporation

( * ) Notice: Subject to any disclaimer, the term of this patent is extended or adjusted under 35 U.S.C. 154(b) by 236 days.

(21) Appl. No.: 16/751,244

(22) Filed: Jan. 24, 2020

(65) Prior Publication Data

US 2020/0238716 A1 Jul. 30, 2020

(30) Foreign Application Priority Data

Jan. 25, 2019 (JP) .............................. JP2019-010983

(51) Int. Cl.
| | |
|---|---|
| *B41J 2/175* | (2006.01) |
| *C09D 11/322* | (2014.01) |
| *C09D 11/38* | (2014.01) |
| *C09D 11/324* | (2014.01) |

(52) U.S. Cl.
CPC ......... B41J 2/17513 (2013.01); C09D 11/322 (2013.01); C09D 11/324 (2013.01); C09D 11/38 (2013.01); *B41J 2002/17516* (2013.01)

(58) Field of Classification Search
CPC ................ B41J 2/17513; B41J 2/17553; B41J 2002/17516; C09D 11/322; C09D 11/30; C09D 11/32; C09D 11/40

See application file for complete search history.

(56) References Cited

U.S. PATENT DOCUMENTS

| | | | | | |
|---|---|---|---|---|---|
| 5,997,136 | A | * | 12/1999 | Fujisawa .............. | B41J 11/002 347/101 |
| 2006/0115638 | A1 | * | 6/2006 | Shibata ............... | B41J 2/17513 428/212 |
| 2007/0229612 | A1 | * | 10/2007 | Oyanagi .............. | B41J 2/17513 347/85 |
| 2011/0094411 | A1 | * | 4/2011 | Oyanagi .............. | C09D 11/36 106/31.9 |
| 2012/0261278 | A1 | * | 10/2012 | Mandzsu .............. | B65B 1/22 220/745 |
| 2013/0321520 | A1 | * | 12/2013 | Ito ....................... | B41J 2/17503 347/20 |
| 2014/0168326 | A1 | * | 6/2014 | Nariai ................... | B41J 2/2107 347/86 |
| 2019/0023927 | A1 | * | 1/2019 | Hama ................... | C09D 11/40 |

FOREIGN PATENT DOCUMENTS

JP  2015-174868 A  10/2015

* cited by examiner

*Primary Examiner* — John Zimmermann
(74) *Attorney, Agent, or Firm* — Harness, Dickey & Pierce, P.L.C.

(57) ABSTRACT

An ink receptacle includes an inner bag filled with an aqueous ink jet ink and a pliable sheath containing the inner bag. The inner bag contains a gas phase in a volume fraction of 0.001 or more relative to the capacity of the inner bag. The aqueous ink jet ink contains a dispersed component, an acetylene glycol surfactant having an HLB of 11 or more, and an acetylene glycol surfactant having an HLB of 9 or less.

13 Claims, 1 Drawing Sheet

INK RECEPTACLE

The present application is based on, and claims priority from, JP Application Serial Number 2019-010983, filed Jan. 25, 2019, the disclosure of which is hereby incorporated by reference herein in its entirety.

BACKGROUND

1. Technical Field

The present disclosure relates to an ink receptacle.

2. Related Art

Textile printing is a known technology in which an image is recorded on fabric, such as woven, knitted, or nonwoven fabric. A recent form of textile printing is based on ink jet recording, for example in light of its advantage of efficient use of ink compositions (hereinafter also simply referred to as "inks"). In this form of textile printing, the ink jet recording is performed using a pigment ink composition for textile printing. The pigment ink composition is primarily water, contains a pigment as a colorant, and is good in color strength on the resulting image.

In the field of industrial pigment textile printing machines, there is a need for increasing the capacity of ink receptacles to enable continuous and high-speed printing. For example, ink receptacles having a capacity of 1 L or more are under development. A known example is an ink cartridge that contains an aqueous ink, an ink that is primarily water (e.g., JP-A-2015-174868).

There is a need for ensuring ejection stability of an aqueous ink jet ink stored in an ink receptacle.

SUMMARY

[1] An ink receptacle including an inner bag filled with an aqueous ink jet ink and a pliable sheath containing the inner bag, wherein the inner bag contains a gas phase in a volume fraction of 0.001 or more relative to the capacity of the inner bag, and the aqueous ink jet ink contains a dispersed component, an acetylene glycol surfactant having an HLB of 11 or more, and an acetylene glycol surfactant having an HLB of 9 or less.

[2] The ink receptacle according to [1], wherein the inner bag contains the gas phase in a volume of 10 mL or more under conditions of 23° C. and 1 atm.

[3] The ink receptacle according to [1] or [2], wherein the inner bag contains the gas phase in a volume of 100 mL or less under conditions of 23° C. and 1 atm.

[4] The ink receptacle according to any one of [1] to [3], wherein the inner bag has a capacity of 1 L or more.

[5] The ink receptacle according to any one of [1] to [4], wherein the inner bag is film at least in part, and the innermost layer, which forms the surface touching the aqueous ink jet ink, of the film is a polyethylene layer.

[6] The ink receptacle according to [5], wherein the film has a layer containing metal oxide particles.

[7] The ink receptacle according to [5] or [6], wherein the film has the polyethylene layer as the innermost layer, a layer containing metal oxide particles, and a polyethylene layer, in order from innermost.

[8] The ink receptacle according to any one of [1] to [4], wherein the ink receptacle has a polyethylene layer as its innermost layer, which forms the surface touching the aqueous ink jet ink, a layer containing metal oxide particles, a polyethylene layer, an air layer, a polyethylene layer, a layer containing metal oxide particles, and a polyethylene layer, in order from innermost.

[9] The ink receptacle according to any one of [5] to [8], wherein the polyethylene layer or layers contain no plasticizer.

[10] The ink receptacle according to any one of [1] to [9], wherein the sheath is an inelastic element.

[11] The ink receptacle according to any one of [1] to [10], wherein the dispersed component has an average particle diameter of 50 nm or more and 800 nm or less.

[12] The ink receptacle according to any one of [1] to [11], wherein the aqueous ink jet ink contains at least one pigment as the dispersed component, and the pigment is one or more selected from carbon black, C.I. Pigment Blue 15:3, C.I. Pigment Violet 23, C.I. Pigment Red 254, and C.I. Pigment Green 36.

[13] The ink receptacle according to any one of [1] to [12], wherein in the aqueous ink jet ink, the percentage of the acetylene glycol surfactant having an HLB of 11 or more is higher than the percentage of the acetylene glycol surfactant having an HLB of 9 or less.

[14] An ink receptacle including an inner bag filled with an aqueous ink jet ink and a pliable sheath containing the inner bag, wherein the inner bag has a surface area of 1150 cm² or more on its surface touching the aqueous ink jet ink, and the aqueous ink jet ink contains a dispersed component, an acetylene glycol surfactant having an HLB of 11 or more, and an acetylene glycol surfactant having an HLB of 9 or less.

[15] An ink receptacle including an inner bag filled with an aqueous ink jet ink and a pliable sheath containing the inner bag, wherein the capacity of the inner bag is 1 L or more and 50 L or less, the inner bag contains 10 mL or more of a gas phase under conditions of 23° C. and 1 atm, and the aqueous ink jet ink contains a dispersed component, an acetylene glycol surfactant having an HLB of 11 or more, and an acetylene glycol surfactant having an HLB of 9 or less.

DESCRIPTION OF EXEMPLARY EMBODIMENTS

The following describes embodiments of the present disclosure. The following embodiments are descriptions of examples of the disclosure. The disclosure is never limited to these embodiments and includes variations implemented within the gist of the disclosure. Not all the configurations described below are essential for the disclosure.

A form of an ink receptacle according to this embodiment includes an inner bag filled with an aqueous ink jet ink and a pliable sheath containing the inner bag. The inner bag contains a gas phase in a volume fraction of 0.001 or more relative to the capacity of the inner bag. The aqueous ink jet ink contains a dispersed component, an acetylene glycol surfactant having an HLB of 11 or more, and an acetylene glycol surfactant having an HLB of 9 or less.

In another form, the ink receptacle according to this embodiment includes an inner bag filled with an aqueous ink jet ink and a pliable sheath containing the inner bag, and the inner bag has a surface area of 1150 cm² or more on its surface touching the aqueous ink jet ink. The aqueous ink jet ink contains a dispersed component, an acetylene glycol surfactant having an HLB of 11 or more, and an acetylene glycol surfactant having an HLB of 9 or less.

In yet another form, the ink receptacle according to this embodiment includes an inner bag filled with an aqueous ink jet ink and a pliable sheath containing the inner bag, the capacity of the inner bag is 1 L or more and 50 L or less, and the inner bag contains 10 mL or more of a gas phase under conditions of 23° C. and 1 atm. The aqueous ink jet ink contains a dispersed component, an acetylene glycol surfactant having an HLB of 11 or more, and an acetylene glycol surfactant having an HLB of 9 or less.

The following describes the ink receptacle according to this embodiment in detail, discussing the ink receptacle itself first and then the ink composition it contains.

1.1. Ink Receptacle

An ink receptacle according to this embodiment includes an inner bag filled with an aqueous ink jet ink and a pliable sheath containing the inner bag. The inner bag contains a gas phase in a volume fraction of 0.001 or more relative to the capacity of the inner bag. The aqueous ink jet ink contains a dispersed component, an acetylene glycol surfactant having an HLB of 11 or more, and an acetylene glycol surfactant having an HLB of 9 or less.

The following describes, with reference to drawings, an ink pack for an ink jet ink as an example of an ink receptacle according to this embodiment. An "ink receptacle" herein can be anything that contains an ink composition directly or indirectly, whether a container or packaging. An ink receptacle is used to store and transport an ink composition before the ink composition is used with a recording apparatus, such as an ink jet printer. Before actual use of the ink composition, moreover, the ink receptacle supplies the ink composition contained therein to the recording apparatus. That is, an ink receptacle may be one that contains an ink composition only for storage, only for transport, or only for the use of the ink composition with a recording apparatus.

An ink receptacle can be in any form, but examples include a cartridge, a bottle, a tank, a pot, and a can besides an ink pack described in this embodiment. In this embodiment, the ink receptacle is preferably in pack form. In pack form, the gas-phase volume is controlled properly, the gas-liquid interface is controlled properly, and aggregates are unlikely to be produced. An ink receptacle in pack form, furthermore, deforms in accordance with the volume of ink extracted therefrom. Ink extraction therefore does not require introducing gas into the receptacle or making the receptacle open to the external air, and it is unlikely that external gases get into the ink, making it easier to ensure stable ejection. The nature of a pack to deform with the extraction of ink therefrom also helps keep the flow rate of ink relatively constant during extraction. In this embodiment, an ink receptacle includes an inner bag filled with ink and a sheath that serves as a casing in which the inner bag is contained for protection.

Figure 1:
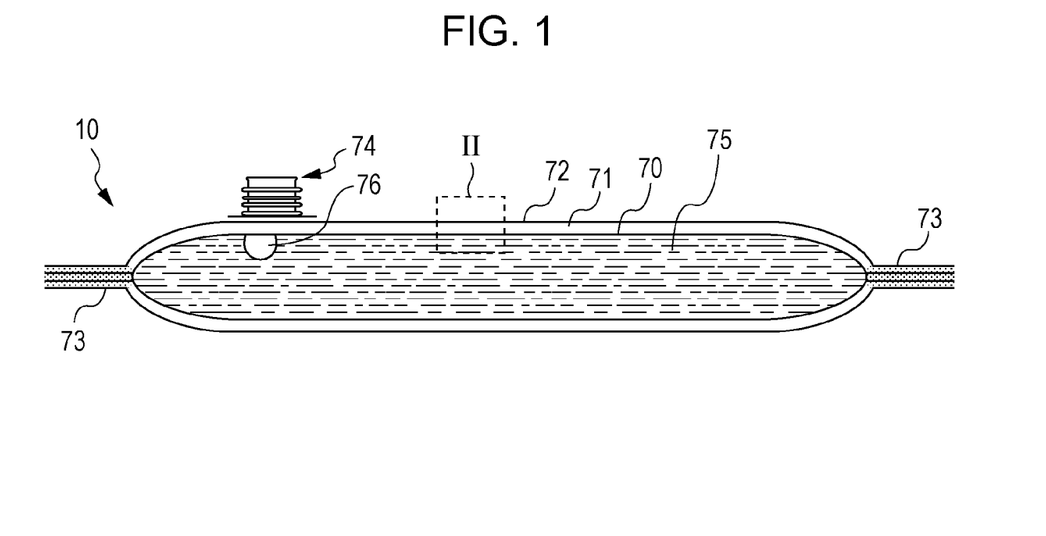
FIG. 1 is a cross-sectional view of an ink pack as an example of an ink receptacle according to an aspect of the present disclosure.
Figure 2:
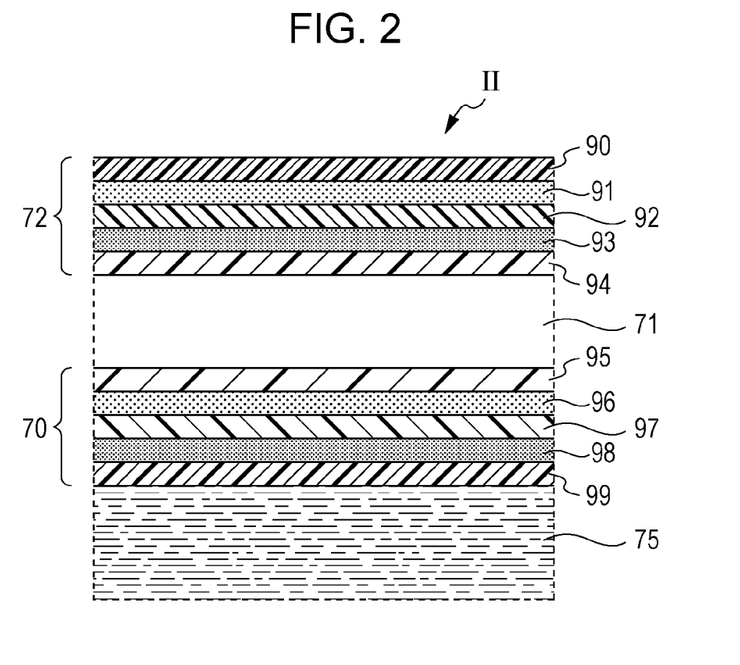
FIG. 2 is an enlarged view of the cross-section illustrated in FIG. 1.

FIG. 1 is a cross-sectional view of an ink pack as an ink receptacle according to this embodiment. FIG. 2 is an enlarged view of the cross-section, of an ink pack, illustrated in FIG. 1. In the drawings referenced hereinafter, elements are drawn to different scales so that each of them is recognizable.

The ink pack 10 illustrated in FIG. 1 has an inner bag 70 filled with an aqueous ink jet ink 75 and a pliable sheath 72 containing the inner bag 70. The pack 10 also has a heat-sealed section 73 as a result of the inner bag 70 and the sheath 72 having been heat-sealed together along their four sides. Except in the heat-sealed section 73, the inner bag 70 and the sheath 72 are not heat-sealed together, and there is an air layer 71 between the inner bag 70 and the sheath 72. The sheath 72 is preferably a bag-shaped casing made of film like the inner bag 70. The ink pack 10 also has an ink outlet 74.

FIG. 2 is an enlarged view of portion II of FIG. 1, or an enlarged schematic view of a cross-section of the ink pack 10. The pliable sheath 72 has a polyethylene film layer 90, an adhesive layer 91, a deposited nylon layer 92, an adhesive layer 93, and a polyethylene film layer 94, in order from outside. The inner bag 70 has a polyethylene film layer 95, an adhesive layer 96, a deposited nylon layer 97, an adhesive layer 98, and a polyethylene film layer 99, in order from outside. The polyethylene film layer 99 touches the ink 75 directly. The inner bag 70 and the sheath 72 are both films.

The structure of the inner bag 70 and that of the sheath 72 do not need to be as in FIG. 2. The inner bag 70 and the sheath 72 may be pliable ones, e.g., ones having a polyethylene layer, a layer containing metal oxide particles, and a polyethylene layer.

By virtue of having the inner bag 70 and the sheath 72, the ink pack 10 is strong.

The ink pack 10 may be put into a box (not illustrated) and installed in a recording apparatus. The ink 75 can be supplied to the ink jet head of the recording apparatus via the ink outlet 74 and piping.

The ink receptacle can take any form in use, but some examples are modes (A), (B), and (C) described below. Mode (A) is a mode in which the ink receptacle is not a component of the recording apparatus, such as an ink jet printer, but an attachment to the recording apparatus. The ink jet ink is supplied to the recording apparatus from an attached ink receptacle. Mode (B) is a mode in which the ink receptacle is not a component of the recording apparatus, and the ink jet ink is supplied from the ink receptacle to the ink tank, for example, of the recording apparatus. Mode (C) is a mode in which the ink receptacle is a built-in part of the recording apparatus.

In modes (A) and (C), the ink jet ink is supplied from the attached or built-in ink receptacle to the ink jet head of the recording apparatus via piping for ink delivery, such as a pliable tube. In mode (B), the ink jet ink is first transferred from the ink receptacle to the ink tank, for example, of the recording apparatus and then supplied from the ink tank to the ink jet head of the recording apparatus via piping for ink delivery, such as a pliable tube. In this embodiment, the ink pack 10 is used in mode (A).

Attaching the ink pack 10 to a recording apparatus, such as an ink jet printer, connects the ink outlet 74 to the piping for ink jet ink of the recording apparatus. As a result, the ink jet ink in the ink pack 10 is supplied to the recording apparatus through the ink outlet 74.

The inner bag 70 and the sheath 72 are preferably film elements at least in part. The films can be of any material, including resins, such as polyethylene terephthalate (PET), polypropylene, polyethylene, (ethylene-vinyl acetate) copolymers, (ethylene-vinyl alcohol) copolymers, and polystyrene, and inorganic materials, such as glass and metals. Some of these materials may be blended in appropriate proportions, or layers of different materials may be stacked. It is particularly preferred to use resin(s) as a multilayer or oriented film. The use of such a film element renders the inner bag 70 and the sheath 72 relatively lightweight and highly flexible. The film elements may have a gas barrier layer, such as a layer of a metal, e.g., aluminum, or a layer of an organic material, e.g., an (ethylene-vinyl alcohol) copolymer or polyvinyl alcohol.

When the inner bag 70 and the sheath 72 are film elements, their thickness is preferably 10 μm or more and 300 μm or less, more preferably 20 μm or more and 200 μm or less, even more preferably 30 μm or more and 150 μm or less, in particular 70 μm or more and 150 μm or less. When formed to a thickness in any of these ranges, the inner bag 70, into which an ink jet ink is packed, and the sheath 72 provide good isolation between their inside and outside, thereby helping control, for example, the dissolution of atmospheric water, gases, etc., in the ink jet ink. With such a thickness, moreover, the inner bag 70 and the sheath 72 remain flexible enough that it is an easy task to fill the ink pack 10 with the ink jet ink.

In this embodiment, the innermost layer across the films forming the inner bag 70 and the sheath 72, i.e., the layer forming the surface that touches the aqueous ink jet ink, is preferably a polyethylene layer. In this embodiment, the aqueous ink jet ink packed into the inner bag 70 is highly wetting on polyethylene by virtue of containing particular types of surfactants as described below. Bubbles present between the ink and polyethylene therefore tend to gather at the ink outlet 74 of the ink pack 10. The bubbles that have gathered then coalesce. The surface area of bubbles decreases, and the dissolution of the gas in the ink slows down. Tiny bubbles remaining between the ink and polyethylene are quick to dissolve in the ink, and the dissolved gas can affect the ejection of the ink from an ink jet head. An example is a case in which the dissolved gas emerges as microbubbles, for example in the ink jet head, and these microbubbles make poor ejection from the ink jet head more likely. The use of a polyethylene layer as the innermost layer of the inner bag 70 therefore helps prevent poor ejection.

The films preferably have a layer containing metal oxide particles. When formed by films that have a layer containing metal oxide particles, the ink pack 10 effectively limits the entry of external gases while maintaining pliability. The ink pack 10 in such a configuration, moreover, prevents atmospheric water from penetrating while being superior in transparency for the contents to be seen. The low permeability to water, furthermore, helps control the emergence of contaminants from events like the absorption of water in the ink packed in the ink pack 10 and the subsequent aggregation of the dispersed component of the ink. Highly resistant to impact, the layer containing metal oxide particles also prevents a deposited surface layer from cracking when the receptacle is dropped.

The metal oxide particles in the layer containing metal oxide particles are preferably, for example, of at least one oxide selected from silica, alumina, titania, zirconia, and ceria. A layer containing such metal oxide particles helps limit the entry of external gases into the ink receptacle more effectively than with other types of metal oxide particles. With such metal oxide particles, moreover, the layer is even less permeable to water. It therefore controls the emergence of contaminants from events like the absorption of water in the ink composition contained and the aggregation of the dispersed component of the ink, thereby ensuring the storage stability of the ink.

One type of metal oxide particles may be used alone, or two or more types may be used in combination. The layer containing metal oxide particles may be a single layer or may be formed by two or more layers.

In the layer containing metal oxide particles, moreover, the portion excluding the metal oxide particles is preferably made of nylon. This further improves transparency and flexibility.

The thickness of the layer containing metal oxide particles is preferably 10 nm or more and 500 nm or less, more preferably 10 nm or more and 100 nm or less, even more preferably 20 nm or more and 80 nm or less. A 10-nm or thicker layer containing metal oxide particles helps limit the entry of external gases into the ink receptacle more effectively than thinner ones. With such a thickness, moreover, the layer containing metal oxide particles is even less permeable to water. It therefore controls contamination caused by events like the absorption of water in the ink composition contained and the aggregation of the dispersed component of the ink, thereby ensuring stability on prolonged storage. When a thickness of 500 nm or less, furthermore, the layer containing metal oxide particles further improves in transparency and flexibility.

The film forming the inner bag 70 preferably has a polyethylene layer, a layer containing metal oxide particles, and a polyethylene layer, in order from innermost. An inner bag 70 formed by a film having such a structure limits the entry of external gases and thereby controls contamination caused by events like the aggregation of the dispersed component of the ink, thereby ensuring the storage stability of the ink.

Preferably, the film forming the inner bag 70 is configured as described above, there is an air layer 71 between the inner bag 70 and the sheath 72 containing it, and the sheath 72 has a polyethylene layer, a layer containing metal oxide particles, and a polyethylene layer, in order from inside, i.e., from the side on which the inner bag 70 is contained. Such an air layer between the sheath 72 and inner bag 70 helps render the ink pack 10 mechanically strong and at the same time pliable and protect the inner bag 70 contained inside by buffering external pressure. The air layer present between the sheath 72 and inner bag 70, furthermore, blocks the entry of plasticizers from the sheath 72, thereby providing good storage stability, in particular that on storage at high temperatures. Between the polyethylene layer, layer containing metal oxide particles, and polyethylene layer, there may be adhesive layers for sticking the layers together. The adhesive layers can contain a known adhesive agent.

In this embodiment, moreover, it is preferred that the polyethylene layer as the innermost layer of the film forming the inner bag 70 contain no plasticizer. Ensuring that only the innermost layer is plasticizer-free helps render the ink pack 10 mechanically strong and at the same time pliable. The plasticizer, moreover, controls contamination by dissolving into the ink. Examples of plasticizers include dioctyl phthalate, diisononyl phthalate, diisodecyl phthalate, dibutyl phthalate, dioctyl adipate, and diisononyl adipate.

For ink packs, a preferred improvement is to increase their capacity to enable continuous, high-speed, and high-density printing. Such a large-capacity ink pack needs to be strong enough that it can withstand the increased weight of its contents, and also has to be pliable so that ink can be extracted at a constant flow rate therefrom while the ink pack is kept tightly closed. That is, a balance is needed between pliability and strength. Pliability requires a plasticizer, but too much plasticizer can cause contaminating aggregates to form as a result of contact between the plasticizer and the ink. Thus the innermost layer of the film forming the inner bag 70 contains no plasticizer, and the other, outer layers of the film contain a plasticizer. As stated, it is preferred that there be an air layer between the inner bag 70 and the sheath 72 containing it because plasticizers in outer layers can migrate into the innermost layer under high-temperature conditions.

Without an air layer, a multilayer structure results in increased strain because of the overall thickness of the ink receptacle. The result is a reduced mechanical strength. An air layer in the ink receptacle therefore ensures the mechanical strength of the ink receptacle.

In this embodiment, the ink pack 10 is formed preferably by inelastic elements. For example, it is preferred that films forming the ink pack 10 do not elongate by 10% or more in a tensile test. Examples of tensile tests include JIS-P-8113: Paper and board—Determination of tensile properties and JIS-Z-0238: Testing methods for heat sealed flexible packages. In these tests, the elasticity of an element can be checked based on whether or not a bag elastically deforms in a heat-seal strength test that is a constant-rate-of-elongation tensile test.

In this embodiment, furthermore, the ink pack 10 may further have a gas barrier layer to limit oxygen penetration. The gas barrier layer can be of any type, but examples include a metal layer, such as an aluminum layer, and an organic layer, such as an ethylene-vinyl alcohol copolymer layer or a polyvinyl alcohol layer.

The capacity of, or the maximum volume of ink composition that can be held in, the inner bag 70 is preferably 1 L or more, more preferably 3 L or more, even more preferably 5 L or more. As for the upper limit, the capacity of the inner bag 70 is, for example, 50 L or less. The use of an inner bag 70 with a capacity in any of these ranges ensures that once the inner bag 70 starts to be used, the ink composition can be used up as quickly as the dissolved oxygen level in the ink in the inner bag 70 changes little. Such a large inner bag 70 also provides excellent storage stability by preventing the chemical makeup of the ink composition from changing during storage. Furthermore, with such a large inner bag 70, printing can be performed continuously and at high speeds because ink replacement is not as frequent as with a smaller one. In this case, the inner bag 70 has a surface area of 1150 cm$^2$ or more, preferably 2350 cm$^2$ or more, more preferably 3850 cm$^2$ or more on its surface touching the aqueous ink jet ink.

In this embodiment, the inner bag 70 contains a gas phase 76 in a volume fraction of 0.001 or more relative to the capacity of the inner bag 70. The presence of a little gas phase 76 in a large-capacity pliable ink pack 10 as described above provides buffer against pressure when the pack deforms while feeding ink, ensuring that the ink is extracted at a constant flow rate without gushing, and, as a result, stable ink delivery is achieved.

Here, a gas phase 76 present in the inner bag 70 can dissolve into the ink. Gas dissolved in ink to saturation can cause poor ejection of the ink, especially in ink jet ejection after prolonged and continuous service. In particular, tiny bubbles entrained in dispersed material(s), such as a pigment and/or resin particles, can have practically irreversible effects, depending on degassing performed in the recording apparatus. In this embodiment, as described below, the aqueous ink jet ink contains particular types of surfactants. These surfactants control the dissolution of gases, ensuring ejection stability.

The inner bag 70 contains the gas phase 76 preferably in a volume of 10 mL or more under conditions of 23° C. and 1 atm. When the volume of the gas phase 76 is 10 mL or more, it is more likely that dissolved gas provokes aggregate contaminants. However, the presence of 10 mL or more gas phase 76 provides buffer against pressure, ensuring that the ink is extracted at a constant flow rate without gushing, and, as a result, stable ink delivery is achieved. The mechanical strength of the ink pack 10, moreover, is maintained. To be more specific, the inner bag 70 needs to deform according to decreasing volume during ink extraction, but when its capacity is large, the inner bag 70 also needs to be strong and therefore is not easily deformable. With a large capacity, therefore, the inner bag 70 can collapse suddenly during ink extraction and, because of the resulting pressure, discharge a gush of ink momentarily. In this embodiment, the presence of a certain volume of gas phase 76 in the inner bag 70 provides buffer against pressure when the inner bag 70 loses its volume abruptly. For these reasons, it is preferred that the volume of the gas phase 76 in the inner bag 70 be 10 mL or more under conditions of 23° C. and 1 atm. The volume of the gas phase 76 in the inner bag 70 is preferably 100 mL or less, more preferably 80 mL or less, even more preferably 60 mL or less under conditions of 23° C. and 1 atm. Setting the volume of the gas phase 76 not to exceed the preferred upper limit will prevent excessive dissolution of the gas in the ink, thereby helping ensure good stability in ejection.

When packing ink into the ink pack 10 in this embodiment, a possible method is to pour an ink that has been degassed beforehand. Examples of degassing treatments include ones based on bubble coalescence, such as vacuum degassing, hollow fiber membrane degassing, circulation degassing systems, and continuous deaerating systems, and one of these degassing techniques or a combination of two or more can be used. It is particularly preferred to use hollow fiber membrane degassing. It is also preferred to use any of these degassing treatments with sonication. Such a degassing treatment enables stable ejection of the ink. The dissolved nitrogen concentration in the degassed ink is preferably 5 ppm or less, more preferably from 1 to 4 ppm.

Then the air inside the inner bag 70 is removed once to make the space inside the inner bag 70 substantially zero. Then ink is poured, with care not to entrap air. The inside of the inner bag 70 is filled with the ink, and the ink outlet 74 is capped. This seals in the ink inside the ink pack 10. Then residual bubbles are guided to the ink outlet 74 and released through the ink outlet 74, for example by pressing down the ink-filled ink pack 10 with hands. The volume of released gas is adjusted so that the volume of gas phase in the ink receptacle will be in a predetermined range.

1.2. Aqueous Ink Jet Ink

The following describes the aqueous ink jet ink (hereinafter also referred to as "ink composition" or "ink") contained in the ink receptacle according to this embodiment.

The aqueous ink jet ink used in this embodiment is a water-based ink composition that contains a dispersed component, an acetylene glycol surfactant having an HLB of 11 or more, and an acetylene glycol surfactant having an HLB of 9 or less and is for use in ink jet recording.

A water-based composition contains water as a major solvent. The water content of the aqueous ink jet ink is preferably 40% by mass or more, more preferably 45% by mass or more, even more preferably 50% by mass or more, in particular 60% by mass or more.

In this embodiment, the aqueous ink jet ink may contain an organic solvent or may be free from organic solvents. The organic solvent content of the ink composition is preferably 30% by mass or less, more preferably 25% by mass or less, in particular 20% by mass or less, with the mass of the ink composition as 100%.

In this embodiment, furthermore, the aqueous ink jet ink may be a pigment ink jet ink composition for textile printing, i.e., a pigment-containing ink composition for use in ink jet textile printing.

1.2.1. Water

In this embodiment, the aqueous ink jet ink contains water. The water is the primary medium in the ink composition and is a component that evaporates away upon drying. Preferably, the water is of a type from which ionic impurities have been removed to the lowest possible levels, such as ion exchange water, ultrafiltered water, reverse osmosis water, distilled water, or any other type of purified water or ultrapure water. The use of sterilized water, for example sterilized by ultraviolet irradiation or adding hydrogen peroxide, is preferred because it helps control the development of molds and bacteria when the ink composition is stored long.

As mentioned above, the water content is preferably 40% by mass or more, more preferably 45% by mass or more, even more preferably 50% by mass or more, in particular 60% by mass or more of the total mass of the aqueous ink jet ink.

1.2.2. Dispersed Component

In this embodiment, the aqueous ink jet ink contains a dispersed component. Examples of dispersed components include a pigment and resin particles.

1.2.2.1. Pigment

Pigments are used as colorants and are not prone to fade, for example in light or gas, compared with dyes. By virtue of this, images formed on a recording medium using pigments are not only superior in quality, but also highly resistant, for example to water, gases, and light, and good in storage properties.

Any type of pigment can be used in this embodiment, but examples include an inorganic pigment and an organic pigment. An inorganic pigment can be, for example, titanium oxide, iron oxide, or carbon black produced by a known process, for example by the channel black, furnace black, or thermal black process. An organic pigment can be, for example, an azo pigment, a polycyclic pigment, a nitro pigment, a nitroso pigment, or aniline black. Examples of azo pigments include azo lakes, insoluble azo pigments, condensed azo pigments, and chelate azo pigments. Examples of polycyclic pigments include phthalocyanine pigments, perylene pigments, perinone pigments, anthraquinone pigments, and quinophthalone pigments.

Of specific examples of pigments that can be used in this embodiment, a class of pigments for black ink is carbon black. The carbon black can be of any type, but examples include furnace black, lamp black, acetylene black, or channel black that is C.I. Pigment Black 7. Examples in the market include Mitsubishi Chemical Corporation's pigments, such as No. 2300, 900, MCF88, No. 20B, No. 33, No. 40, No. 45, No. 52, MA7, MA8, MA77, MA100, and No. 2200B, Evonic Japan Co., Ltd.'s pigments, such as Color Black FW1, FW2, FW2V, FW18, FW200, S150, S160, and S170, Printex 35, U, V, and 140U, and Special Black 6, 5, 4A, 4, and 250, Columbian Carbon's pigments, such as Conductex SC and Raven 1255, 5750, 5250, 5000, 3500, 1255, and 700, and Cabot Japan K.K.'s pigments, such as REGAL 400R, 330R, and 660R, MOGUL L, MONARCH 700, 800, 880, 900, 1000, 1100, 1300, and 1400, and ELFTEX 12.

Examples of pigments used in white ink include inorganic white pigments, such as C.I. Pigment White 6, 18, and 21, titanium oxide, zinc oxide, zinc sulfide, antimony oxide, magnesium oxide, and zirconium oxide, although any appropriate pigment can be used. As well as white inorganic pigments, white organic pigments, such as hollow plastic microparticles and polymer particles in white, can be used.

Examples of pigments used in yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180, although any appropriate pigment can be used.

Examples of pigments used in magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, although any appropriate pigment can be used.

Examples of pigments used in cyan ink include C.I. Pigment Blue 1, 2, 3, 15, 15:1, 15:2, 15:3, 15:34, 15:4, 16, 18, 22, 25, 60, 65, and 66 and C.I. Vat Blue 4 and 60, although any appropriate pigment can be used.

Examples of pigments used in color inks other than magenta, cyan, and yellow include C.I. Pigment Green 7, 10, and 36, C.I. Pigment Brown 3, 5, 25, and 26, C.I. Pigment Orange 1, 2, 5, 7, 13, 14, 15, 16, 24, 34, 36, 38, 40, 43, and 63, C.I. Pigment Red 254, and C.I. Pigment Violet 19, 23, 32, 33, 36, 38, 43, and 50, although any appropriate pigment can be used. Such pigments, used in color inks other than magenta, cyan, and yellow, are hereinafter also referred to as spot color pigments.

Examples of pearl pigments include pigments that have a pearly or interference luster, such as titanium dioxide-coated mica, pearl essence, and bismuth oxychloride, although any pearl pigment can be used.

Examples of metallic pigments include particles of pure metals, such as aluminum, silver, gold, platinum, nickel, chromium, tin, zinc, indium, titanium, and copper, or alloys of such metals, although any metallic pigment can be used.

The average particle diameter of the pigment is preferably 50 nm or more, more preferably 100 nm or more. When the pigment is a C.I. Pigment Red, the average particle diameter is preferably 200 nm or more. The average particle diameter of the pigment is preferably 800 nm or less, more preferably 600 nm or less, even more preferably 400 nm or less. The use of a pigment with an average particle diameter in any of these ranges ensures stability on storage in the ink receptacle and also ensures stability in ejection from an ink jet head. With such an average particle diameter, moreover, the pigment is better in color strength on the resulting print.

Not highly dispersible, spot color pigments and carbon black in ink tend to have large particle diameters or disperse in an unstable fashion. They therefore often form contaminating aggregates, whether of the pigment alone or with other substances, that make it difficult to continuously print large-area images at a high density. In this embodiment, even pigments with large particle diameters, which often become a source of contaminants, can be used by virtue of the configuration of an ink receptacle as described above plus surfactants as described below. This embodiment therefore helps achieve good color reproduction.

An "average particle diameter" herein refers to the median diameter by volume D50 of the particles in the ink. The particle size distribution of inks can be measured using, for example, HORIBA, Ltd.'s "LA-960" (trade name) laser diffraction/scattering particle size analyzer. To be more specific, undiluted analysis can be performed; the ink is transferred as freshly prepared, or undiluted, using a syringe to a high-concentration and low-viscosity cell having an optical path length of 1 μm, and measurement is performed with the ink filling the cell uniformly.

The pigment content is preferably, for the lower limit, 1% by mass or more, more preferably 3% by mass more, even more preferably 4% by mass or more, with the total mass of the aqueous ink jet ink as 100%. As for the upper limit, the pigment content is preferably 10% by mass or less, more preferably 7% by mass or less, even more preferably 6% by mass or less of the total mass of the ink composition. A pigment content in any of these ranges ensures stability on storage in the ink receptacle and also ensures stability in ejection from an ink jet head. When the pigment content is in any such range, moreover, the pigment is better in color strength on the resulting print.

One of such pigments may be used alone, or two or more may be used as a mixture. Preferably, the pigment(s) is subjected to surface treatment or used with a dispersant or similar material in the ink composition for better dispersion in the ink composition. Surface treatment of a pigment is a process in which a hydrophilic group, such as the carboxy or sulfo group, is introduced to the surface of particles of the pigment by a physical or chemical treatment. Surface treatment of a pigment helps disperse the pigment in an aqueous medium, such as water.

A dispersant for use in aqueous media adsorbs onto the surface of particles of a pigment with the hydrophobic moiety, which is a hydrophobic group, of its molecular structure, and directs the hydrophilic moiety, which is a hydrophilic group, toward the medium. This is the mechanism of action by which a dispersant makes a pigment dispersible in an aqueous medium. A dispersant can be, for example, a known surfactant or polymer. Alternatively, the pigment(s) may be rendered dispersible by covering its/their particles, for example with a polymer. The covering of the particles of the pigment(s) can be achieved by, for example, separation using acid, phase inversion emulsification, or mini-emulsion polymerization.

1.2.2.2. Resin Particles

Resin particles solidify the ink composition and fix the solidified ink to a recording medium firmly. In this embodiment, resin particles may be present dissolved in the ink composition or dispersed in the ink composition. A dissolved resin can be a resin dispersant as described above that is used when pigment(s) is dispersed in the ink. A dispersed resin can be a resin sparingly soluble or insoluble in the liquid medium or media in the ink. Fine particles of such a resin are dispersed in the ink to make it an emulsion or suspension.

Examples of resins that can be used for such resin particles include acrylic resins, styrene-acrylic resins, fluorene resins, urethane resins, polyolefin resins, rosin-modified resins, terpene resins, polyester resins, polyamide resins, epoxy resins, vinyl chloride resins, vinyl chloride-vinyl acetate copolymers, and ethylene vinyl acetate resins. One of these resins may be used alone, or two or more may be used in combination. Of these, it is particularly preferred to use at least one selected from urethane resins and acrylic resins, more preferably urethane resin(s). With these types of resins, it is easier to achieve the desired coating characteristics, such as the aforementioned glass transition temperature and elongation of the coating, by virtue of their design flexibility.

Any urethane resin can be used that has the urethane structure and is dispersible in water. For example, a urethane resin may be a commercially available one, such as DKS Co. Ltd.'s SUPERFLEX 460, 460s, or 840; Dainichiseika Color & Chemicals Mfg. Co. Ltd.'s RESAMINE D-1060, D-2020, D-4080, D-4200, D-6300, or D-6455; Mitsui Chemicals Polyurethanes, Inc.'s Takelac WS-6021 or W-512-A-6; or Lubrizol Japan Ltd.'s Sancure 2710.

A urethane resin can be a polyether urethane resin, which contains, besides the urethane linkage, the ether linkage in its backbone, a polyester urethane resin, which contains the ester linkage in its backbone, or a polycarbonate urethane resin, which contains the carbonate linkage in its backbone. Two or more of these types of urethane resins can be used in combination, and it is preferred to use polycarbonate urethane resin(s).

An acrylic resin can be, for example, a polymer of an acrylic monomer, such as acrylic acid or an acrylate, or a copolymer of an acrylic monomer and a non-acrylic monomer. An example of a non-acrylic monomer is a vinyl monomer, such as styrene. Commercially available acrylic resins may also be used, and examples include the Nippon Synthetic Chemical Co., Ltd.'s Mowinyl 702, 7502, 7525, and 7320.

In this embodiment, the percentage of resin particles is preferably 3% by mass or more, more preferably 4% by mass or more, even more preferably 6% by mass or more of the total mass of the aqueous ink jet ink on a solids basis. As for the upper limit, the percentage of resin particles is 15% by mass or less, more preferably 12% by mass or less, even more preferably 10% by mass or less. A percentage of resin particles in any of these ranges ensures stability on storage in the ink receptacle and also ensures stability in ejection from an ink jet head. When the percentage of resin particles is in any such range, moreover, the resulting print is superior in abrasion resistance.

The total percentage of resin particles is preferably, for the lower limit, 1.0% by mass or more, more preferably 2% by mass or more, more preferably 3% by mass or more of the total mass of the aqueous ink jet ink on a solids basis. As for the upper limit, the percentage of resin particles is preferably 15% by mass or less, more preferably 10% by mass or less, even more preferably 7% by mass or less of the total mass of the aqueous ink jet ink. A percentage of resin particles in any of these ranges ensures stability on storage in the ink receptacle and also ensures stability in ejection from an ink jet head. When the percentage of resin particles is in any such range, moreover, the image formed is superior in abrasion resistance even on a low- or non-ink-absorbing recording medium.

The average particle diameter of the dispersed component in the ink is preferably 50 nm or more and 1000 nm or less, more preferably 50 nm or more and 800 nm or less, even more preferably 200 nm or more and 800 nm or less. The use of a dispersed component with an average particle diameter in any of these ranges prevents the dispersion from entraining tiny bubbles, thereby making it easier to achieve stable ejection.

1.2.3. Surfactant

In this embodiment, the aqueous ink jet ink contains surfactants: an acetylene glycol surfactant having an HLB of 11 or more (hereinafter also referred to as a "surfactant A") and an acetylene glycol surfactant having an HLB of 9 or less (hereinafter also referred to as a "surfactant B"). In this embodiment, two types of acetylene glycol surfactants with different HLBs present in the aqueous ink jet ink control the dynamic surface tension and wettability of the ink, thereby helping ensure stability on storage in the ink receptacle and ejection stability.

The HLB (hydrophile-lipophile balance) of a surfactant is a value calculated by the Griffin method. Specifically, the HLB of a surfactant can be determined according to equation (H) below.

$$HLB = 20 \times (\% \text{ by mass of hydrophilic groups}) \quad \ldots (H)$$

In this embodiment, the aqueous ink jet ink contains a surfactant A, which is an acetylene glycol surfactant having an HLB of 11 or more, as a surfactant. Highly hydrophilic, acetylene glycol surfactants having an HLB of 11 or more promote wetting on a recording medium and image uniformity. This type-A surfactant, on the other hand, has ejection-aiding properties, or reduces the surface tension of the ink containing it. The presence of this type of surfactant therefore causes the ink to easily foam, and the gas in the foam dissolves quickly in the ink if the bubbles are tiny. To counter this, a surfactant A is used in combination with a surfactant B, which is an acetylene glycol surfactant having an HLB of 9 or less. By serving as a foam breaker, the surfactant B helps limit foaming. The surfactant B also reduces bleed in the resulting recorded image.

The HLB of the surfactant A is preferably 12 or more, more preferably 13 or more, even more preferably 14 or more. As for the upper limit, it is preferred that the surfactant A have an HLB of 16 or less. With an HLB in any of these ranges, the surfactant A becomes better in wettability. When two or more acetylene glycol surfactants are used in combination, the HLB is determined by weighted averaging.

As for commercially available surfactants A, any product in the market can be used but examples include Nissin Chemical Industry Co., Ltd.'s OLFINE 104 series and OLFINE E series, such as OLFINE E1006 (HLB, from 11 to 12), OLFINE E1010 (HLB, from 13 to 14), and OLFINE E1020 (HLB, from 15 to 16) and Nippon Nyukazai Co., Ltd.'s Newcol 1004 (HLB, 11.5), Newcol 1006 (HLB, 13.4), and Newcol 1008 (HLB, 14.6). One of these surfactants may be used alone, or two or more may be used in combination.

One surfactant A may be used alone, or a combination of two or more may be used. The surfactant A content is preferably 0.1% by mass or more and 1.5% by mass or less, more preferably 0.1% by mass or more and 1.2% by mass or less, even more preferably 0.2% by mass or more and 1.0% by mass or less of the total mass of the ink. A surfactant A content in any of these ranges leads to improved storage stability and ejection stability. Preferably, the surfactant A content is higher than the surfactant B (described below) content.

An example of a surfactant B, which is an acetylene glycol surfactant having an HLB of 9 or less, is an alkylene oxide adduct of an acetylene glycol having ten or more carbon atoms in the main chain. Surfactants B are included in nonionic surfactants. Nonionic surfactants spread ink uniformly on a recording medium, so ink jet recording performed using an ink containing a nonionic surfactant provides relatively high-definition images with little bleed. A "main chain" as mentioned herein refers to a main chain according to the IUPAC nomenclature.

Highly hydrophobic and having antifoaming properties, such a surfactant B controls the dynamic surface tension and wettability of the ink, thereby helping improve ejection stability, when used in combination with a different surfactant. The surfactant B, moreover, wets well contaminants, a potential cause of foaming on the elements forming the ink receptacle or in the ink. The use of a surfactant B therefore helps prevent any bubble formed on the surface of a channel made of polymers from the ink receptacle to a head from remaining there. Missing dots caused by the growth of remaining bubbles and those caused by the separation of bubbles adhering to the surface of the channel are also prevented, ensuring good ejection stability.

The HLB of the surfactant B is preferably 8 or less because this makes the surfactant B superior in anti-foaming properties. More preferably, the HLB of the surfactant B is 6 or less, even more preferably 4 or less. As for the lower limit, it is preferred that the surfactant B have an HLB of 3 or more. With an HLB in any of these ranges, the surfactant B becomes better in anti-foaming properties. When two or more acetylene glycol surfactants are used in combination, the HLB is determined by weighted averaging.

Any surfactant B can be used, but a specific example is one or more selected from 2,4,7,9-tetramethyl-5-decin-4,7-diol and alkylene oxide adducts of 2,4,7,9-tetramethyl-5-decin-4,7-diol and 2,4-dimethyl-5-decin-4-ol and alkylene oxide adducts of 2,4-dimethyl-5-decin-4-ol.

As for commercially available surfactants B, any product in the market can be used but examples include Nissin Chemical Industry Co., Ltd.'s Surfynol 104S (HLB: 4), Surfynol 61 (HLB: 6), Surfynol 104S (HLB: 4), Surfynol 104PG50 (HLB: 4), Surfynol 420 (HLB: 4), Surfynol 82 (HLB: 4), Surfynol DF110D (HLB: 3), and Surfynol MD-20 (HLB, 4). One of these surfactants may be used alone, or two or more may be used in combination.

One surfactant B may be used alone, or a combination of two or more may be used. The surfactant B content is preferably 0.05% by mass or more and 1.0% by mass or less, more preferably 0.1% by mass or more and 0.8% by mass or less, even more preferably 0.2% by mass or more and 0.6% by mass or less of the total mass of the ink. A surfactant B content in any of these ranges leads to improved reduction of the formation of foam and improved ejection stability and storage stability. Preferably, the surfactant B content is lower than the surfactant A (described above) content.

In this embodiment, the surfactant A content is preferably higher than the surfactant B content. When the surfactant A content is higher than the surfactant B content, the surfactants control the dynamic surface tension and wettability of the ink and thereby limit the emergence of contaminants more effectively. In such proportions, therefore, the surfactants are more helpful in ensuring stability on storage in the ink receptacle and ejection stability.

In this embodiment, the ink may contain, besides these particular acetylene glycol surfactants, a fluorosurfactant and/or a silicone surfactant.

Any fluorosurfactant can be used, but examples include perfluoroalkyl sulfonates, perfluoroalkyl carboxylates, perfluoroalkyl phosphates, perfluoroalkyl ethylene oxide adducts, perfluoroalkyl betaines, and perfluoroalkyl amine oxide compounds. As for commercially available fluorosurfactants, any product in the market can be used but examples include Asahi Glass Co., Ltd.'s S-144 and S-145; Sumitomo 3M Ltd.'s FC-170C, FC-430, and FLUORAD-FC4430; DuPont Japan K.K.'s FSO, FSO-100, FSN, FSN-100, and FS-300; and NEOS Co., Ltd.'s FT-250 and 251. One fluorosurfactant may be used alone, or two or more may be used in combination.

Examples of silicone surfactants include polysiloxane compounds and polyether-modified organosiloxanes. As for commercially available silicone surfactants, any product in the market can be used but examples include BYK Japan KK's BYK-306, BYK-307, BYK-333, BYK-341, BYK-345, BYK-346, BYK-347, BYK-348, and BYK-349; and Shin-Etsu Chemical Co., Ltd.'s KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017.

1.2.4. Organic Solvent

In this embodiment, the aqueous ink jet ink preferably contains an organic solvent. The presence of an organic solvent in the aqueous ink jet ink makes the ink superior in the anti-clogging properties on recording. The presence of an organic solvent in the aqueous ink jet ink also helps obtain images excellent in quality and abrasion resistance by ensuring good drying characteristics of the ink composition when ejected onto a recording medium.

Examples of organic solvents include polyol compounds, glycol ethers, and betaine compounds.

An example of a polyol compound is a C2 to C6 polyol compound (preferably a diol compound) optionally having one ether linkage in the molecule. Specific examples include glycols such as 1,2-pentanediol, methyl triglycol (triethylene glycol monomethyl ether), butyl triglycol (triethylene glycol monobutyl ether), butyl diglycol (diethylene glycol monobutyl ether), dipropylene glycol monopropyl ether, glycerol, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,3-propanediol, 1,2-butanediol, 1,2-pentanediol, 1,4-butanediol, 1,5-pentanediol, 1,6-hexanediol, 2-methyl-2,4-pentanediol, and 3-methyl-1,5-pentanediol.

A glycol ether is preferably, for example, a monoalkyl ether of a glycol selected from ethylene glycol, diethylene glycol, triethylene glycol, polyethylene glycol, propylene glycol, dipropylene glycol, tripropylene glycol, polypropylene glycol, and polyoxyethylene polyoxypropylene glycol. More preferred glycol ethers include triethylene glycol monomethyl ether, triethylene glycol monobutyl ether, and dipropylene glycol monopropyl ether.

A betaine compound is a compound that has positive and negative charges in nonadjacent positions in the same molecule, in which no dissociable hydrogen atom is bound to the atom having the positive charge, and that has no electric charge as a whole (inner salt). A preferred betaine compound is an N-alkyl-substituted derivative of an amino acid, more preferably an N-trialkyl-substituted derivative of an amino acid. Examples of betaine compounds include trimethylglycine (also referred to as "glycine betaine"), γ-butyrobetaine, homarine, trigonelline, carnitine, homoserine betaine, valine betaine, lysine betaine, ornithine betaine, alanine betaine, stachydrine, and glutamic acid betaine, and examples of preferred ones include trimethyl glycine.

The organic solvent may alternatively be a pyrrolidone derivative. Examples of pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone.

A mixture of multiple organic solvents may also be used. The organic solvent(s), moreover, is added preferably so that the viscosity and surface tension of the ink will be in their respective desired ranges, which are given below, and the organic solvent content is preferably 1% by mass or more and 30% by mass or less, more preferably 5% by mass or more and 20% by mass or less, even more preferably 10% by mass or more and 15% by mass or less of the total mass of the ink.

1.2.5. Extra Ingredients

In this embodiment, the aqueous ink jet ink may optionally contain ingredients such as a pH-adjusting agent, a preservative/antimold, an antirust, a chelating agent, a viscosity modifier, a dissolution aid, and an antioxidant.

1.2.5.1. pH-Adjusting Agent

In this embodiment, the aqueous ink jet ink preferably contains a pH-adjusting agent for the purpose of pH adjustment. The pH-adjusting agent can be of any kind, but examples include acids, bases, weak acids, weak bases, and appropriate combinations of them. For example, tertiary alkanolamines, such as triethanolamine and triisopropanolamine, are pH-adjusting agents. When pH-adjusting agents are added, it is preferred that their total percentage be 0.01% by mass or more and 2% by mass or less, more preferably 0.1% by mass or more and 1% by mass or less, even more preferably 0.2% by mass or more and 0.5% by mass or less of the total mass of the ink composition.

1.2.5.2. Preservative/Antimold

In this embodiment, a preservative and/or an antimold may optionally be added to the aqueous ink jet ink. Examples of preservatives and antimolds include sodium benzoate, sodium pentachlorophenate, sodium 2-pyridinethiol-1-oxide, sodium sorbate, sodium dehydroacetate, 1,2-dibenzisothiazolin-3-one, such as PROXEL CRL, BDN, GXL, XL-2, TN, and LV, to be available from Lonza Japan Ltd., and 4-chloro-3-methylphenol, such as Preventol® CMK, to be available from Bayer Holding Ltd.

1.2.5.3. Chelating Agent

Chelating agents bind ions. Examples of such chelating agents include ethylenediaminetetraacetic acid (EDTA) and the nitrilotriacetate, hexametaphosphate, pyrophosphate, or metaphosphate of ethylenediamine.

1.2.5.4. Wax

Examples of waxes include vegetable/animal waxes, such as carnauba wax, candelilla wax, beeswax, rice bran wax, and lanolin; mineral waxes, such as montan wax and ozokerite; petroleum waxes, such as paraffin wax; and synthetic waxes, such as carbon wax, hoechst wax, polyolefin waxes, and stearic acid amides, natural/synthetic wax emulsions, such as α-olefin-maleic anhydride copolymers, and compound waxes. One of these waxes or a mixture of multiple waxes can be used. Of these, waxes such as silicone waxes, polyolefin waxes, and paraffin wax are particularly preferred for use.

When waxes are contained, their total percentage can be, for example, 0.01% by mass or more and 2.0% by mass or less of the total mass of the ink composition.

1.2.6. Preparation of the Aqueous Ink Jet Ink

In this embodiment, the aqueous ink jet ink is obtained by mixing the ingredients described above in any order, optionally followed by removing impurities, for example by filtration. The mixing of the ingredients is achieved preferably by adding the materials one by one to a container equipped with a stirrer, such as a mechanical or magnetic stirrer, and then stirring and mixing the materials. The filtration can be done by, for example, performing centrifugal filtration and/or passing the mixture through a filter as needed.

1.2.7. Characteristics of the Aqueous Ink Jet Ink

1.2.7.1. Surface Tension

In this embodiment, the aqueous ink jet ink preferably has a surface tension at 20° C. of 10 mN/m or more and 40 mN/m or less, more preferably 25 mN/m or more and 36 mN/m or less in light of the balance between quality in textile printing and reliability as an ink jet ink. A surface tension at 20° C. in any of these ranges makes the ink superior in ejection stability in ink jet recording. Once the ink adheres to fabric, furthermore, such a surface tension helps the ink spread uniformly on and penetrate into the fabric, thereby helping the ink become fixed on the fabric.

As for measurement, the surface tension can be measured by, for example, wetting a platinum plate with the ink and checking the surface tension under 20° C. conditions using CBVP-Z automated surface tensiometer (trade name, Kyowa Interface Science Co., Ltd.). A possible way to control the surface tension to any of the above ranges is through appropriate customization of, for example, organic solvent(s) and/or surfactants, both discussed above, and the percentages of them and water.

1.2.7.2. Viscosity

The viscosity at 20° C. of the aqueous ink jet ink, moreover, is preferably 1 mPa·s or more and 12 mPa·s or less, more preferably 2 mPa·s or more and 10 mPa·s or less. When the viscosity at 20° C. of the ink is in any of these ranges, the ink is quicker to become fixed once adhering to fabric and therefore improves in color strength.

As for measurement, the viscosity can be measured using, for example, a rheometer of the MCR series (trade name, Anton Paar). A possible way to control the viscosity to any of the above ranges is through appropriate customization of, for example, organic solvent(s) and/or surfactants, both discussed above, and the percentages of them and water.

1.3. Advantages

Although gas dissolved in ink usually causes poor ejection of the ink, the ink receptacle according to this embodiment contains a predetermined volume of gas phase so that the gas will provide buffer against pressure when the ink receptacle deforms while feeding ink. The ink is therefore extracted at a constant flow rate without gushing, and, as a result, stable ink delivery is achieved. The presence of particular types of surfactants in the ink packed in the ink receptacle, moreover, ensures ejection stability by limiting the dissolution of the gas and reducing the nucleation of bubbles. Overall, it becomes possible to increase the capacity of an ink receptacle for continuous, high-speed, and high-density printing.

2. EXAMPLES

The following describes an aspect of the present disclosure in further detail by providing examples and comparative examples, but no aspect of the disclosure is limited to these Examples. In the Examples and Comparative Examples, "parts" and "%" are by mass unless stated otherwise.

2.1. Preparation of Ink Compositions

Ingredients were put into a container according to the formula specified in Table 1 or 2, mixed and stirred for 2 hours using a magnetic stirrer, and thoroughly mixed by dispersion in a bead mill loaded with 0.3-mm zirconia beads. The mixture was stirred for 1 hour and then filtered using a 5-μm PTFE membrane filter, completing ink. The values in Tables 1 and 2 represent percentages by mass, and the purified water was added to make the total mass of the ink 100%.

For those ingredients listed in Tables 1 and 2 not referred to by compound name, the details are as follows.

Pigment Dispersions
  Pigment dispersion A: C.I. Pigment Red 254
  Pigment dispersion B: C.I. Pigment Green 36
  Pigment dispersion C: C.I. Pigment Orange 43
  Pigment dispersion D: C.I. Pigment Violet 23
  Pigment dispersion E: C.I. Pigment Blue 15:3
  Pigment dispersion F: C.I. Pigment Red 122
  Pigment dispersion G: C.I. Pigment Yellow 180
  Pigment dispersion H: Carbon black
  Resin dispersion: Urethane resin, Mitsui Chemicals Polyurethanes, Inc.'s Takelac WS-6021
  Inorganic alkali: Potassium hydroxide (Junsei Chemical Co., Ltd.)
Surfactants
  Surfactant A1: Nissin Chemical Industry Co., Ltd.'s OLFINE E1010, an acetylene glycol surfactant with HLB=13 to 14
  Surfactant A2: Nissin Chemical Co., Ltd.'s OLFINE E1006, an acetylene glycol surfactant with HLB=11 to 12
  Surfactant A3: Nissin Chemical Co., Ltd.'s OLFINE E1020, an acetylene glycol surfactant with HLB=15 to 16
  Surfactant B1: Air Products Japan, K.K.'s Surfynol 104, an acetylene glycol surfactant with HLB=4
  Surfactant B2: Air Products Japan, K.K.'s Surfynol 440, an acetylene glycol surfactant with HLB=8

TABLE 1

|  | Example 1 | Example 2 | Example 3 | Example 4 | Example 5 | Example 6 | Example 7 | Example 8 |
|---|---|---|---|---|---|---|---|---|
| Pigment dispersion A: Red | 5 | 5 | 5 | — | — | — | — | — |
| Pigment dispersion B: Green | — | — | — | 5 | — | — | — | — |
| Pigment dispersion C: Orange | — | — | — | — | 5 | — | — | — |
| Pigment dispersion D: Violet | — | — | — | — | — | 5 | — | — |
| Pigment dispersion E: Cyan | — | — | — | — | — | — | 5 | — |
| Pigment dispersion F: Magenta | — | — | — | — | — | — | — | 5 |
| Pigment dispersion G: Yellow | — | — | — | — | — | — | — | — |

TABLE 1-continued

|  |  |  |  |  |  |  |  |  |
|---|---|---|---|---|---|---|---|---|
| Pigment dispersion H: Black | — | — | — | — | — | — | — | — |
| Resin dispersion: Urethane resin | 6 | 6 | 6 | 6 | 6 | 6 | 6 | 6 |
| Glycerol | 6 | 6 | 6 | 6 | 6 | 6 | 6 | 6 |
| Trimethylolpropane | 8 | 8 | 8 | 8 | 8 | 8 | 8 | 8 |
| Triethylene glycol | 5 | 5 | 5 | 5 | 5 | 5 | 5 | 5 |
| EDTA | 0.1 | 0.1 | 0.1 | 0.1 | 0.1 | 0.1 | 0.1 | 0.1 |
| Inorganic alkali | 0.1 | 0.1 | 0.1 | 0.1 | 0.1 | 0.1 | 0.1 | 0.1 |
| Surfactant A1 | 1 | 1 | 1 | 1 | 1 | 1 | 1 | 1 |
| Surfactant A2 | — | — | — | — | — | — | — | — |
| Surfactant A3 | — | — | — | — | — | — | — | — |
| Surfactant B1 | 0.1 | 0.5 | 1 | 0.5 | 0.5 | 0.5 | 0.5 | 0.5 |
| Surfactant B2 | — | — | — | — | — | — | — | — |
| Purified water | 68.7 | 68.3 | 67.8 | 68.3 | 68.3 | 68.3 | 68.3 | 69.3 |
| Average particle diameter: undiluted analysis | 300 nm | 280 nm | 280 nm | 90 nm | 90 nm | 80 nm | 90 nm | 100 nm |
| Ink receptacle inner bag capacity (L) | 10 | 10 | 10 | 10 | 10 | 10 | 10 | 10 |
| Gas phase volume (mL) | 30 | 30 | 30 | 30 | 30 | 30 | 30 | 30 |
| Gas phase volume/inner bag capacity ratio | 0.003 | 0.003 | 0.003 | 0.003 | 0.003 | 0.003 | 0.003 | 0.003 |
| Receptacle innermost layer | Polyethylene | Polyethylene | Polyethylene | Polyethylene | Polyethylene | Polyethylene | Polyethylene | Polyethylene |
| Ink receptacle inner bag surface area (cm$^2$) | 3850 | 3850 | 3850 | 3850 | 3850 | 3850 | 3850 | 3850 |
| Ink receptacle's elasticity | Inelastic | Inelastic | Inelastic | Inelastic | Inelastic | Inelastic | Inelastic | Inelastic |
| Layer containing metal oxide particles | Yes | Yes | Yes | Yes | Yes | Yes | Yes | Yes |
| Plasticizer in the innermost layer | No | No | No | No | No | No | No | No |
| Ink receptacle layer structure (multiple film layers) | Yes | Yes | Yes | Yes | Yes | Yes | Yes | Yes |
| Ink receptacle layer structure (air layer) | Yes | Yes | Yes | Yes | Yes | Yes | Yes | Yes |
| Prolonged exposure to high temperature (14 days at 60° C.) | A | A | A | A | A | A | A | A |
| Poor ejection | A | A | A | A | A | A | A | A |
| Bleed at image edges | B | A | A | A | A | A | A | A |
| Solid image uniformity | A | A | B | A | A | A | A | A |

|  | Example 9 | Example 10 | Example 11 | Example 12 | Example 13 | Example 14 | Example 15 | Example 16 |
|---|---|---|---|---|---|---|---|---|
| Pigment dispersion A: Red | — | — | 5 | 5 | 5 | 5 | 5 | 5 |
| Pigment dispersion B: Green | — | — | — | — | — | — | — | — |
| Pigment dispersion C: Orange | — | — | — | — | — | — | — | — |
| Pigment dispersion D: Violet | — | — | — | — | — | — | — | — |
| Pigment dispersion E: Cyan | — | — | — | — | — | — | — | — |
| Pigment dispersion F: Magenta | — | — | — | — | — | — | — | — |
| Pigment dispersion G: Yellow | 5 | — | — | — | — | — | — | — |
| Pigment dispersion H: Black | — | 5 | — | — | — | — | — | — |
| Resin dispersion: Urethane resin | 6 | 6 | 6 | 6 | 6 | 6 | 6 | 6 |
| Glycerol | 6 | 6 | 6 | 6 | 6 | 6 | 6 | 6 |
| Trimethylolpropane | 8 | 8 | 8 | 8 | 8 | 8 | 8 | 8 |
| Triethylene glycol | 5 | 5 | 5 | 5 | 5 | 5 | 5 | 5 |
| EDTA | 0.1 | 0.1 | 0.1 | 0.1 | 0.1 | 0.1 | 0.1 | 0.1 |
| Inorganic alkali | 0.1 | 0.1 | 0.1 | 0.1 | 0.1 | 0.1 | 0.1 | 0.1 |
| Surfactant A1 | 1 | 1 | — | — | 1 | 1 | 1 | 1 |
| Surfactant A2 | — | — | 1 | — | — | — | — | — |
| Surfactant A3 | — | — | — | 1 | — | — | — | — |
| Surfactant B1 | 0.5 | 0.5 | 0.5 | 0.5 | — | 0.5 | 0.5 | 0.5 |
| Surfactant B2 | — | — | — | — | 0.5 | — | — | — |
| Purified water | 69.3 | 69.3 | 68.3 | 68.3 | 68.8 | 68.3 | 68.3 | 68.3 |
| Average particle diameter: undiluted analysis | 90 nm | 80 nm | 280 nm | 290 nm | 290 nm | 280 nm | 300 nm | 300 nm |
| Ink receptacle inner bag capacity (L) | 10 | 10 | 10 | 10 | 10 | 1 | 5 | 20 |
| Gas phase volume (mL) | 30 | 30 | 30 | 30 | 30 | 30 | 30 | 30 |
| Gas phase volume/inner bag capacity ratio | 0.003 | 0.003 | 0.003 | 0.003 | 0.003 | 0.03 | 0.006 | 0.0015 |
| Receptacle innermost layer | Polyethylene | Polyethylene | Polyethylene | Polyethylene | Polyethylene | Polyethylene | Polyethylene | Polyethylene |
| Ink receptacle inner bag surface area (cm$^2$) | 3850 | 3850 | 3850 | 3850 | 3850 | 1150 | 2350 | 6850 |
| Ink receptacle's elasticity | Inelastic | Inelastic | Inelastic | Inelastic | Inelastic | Inelastic | Inelastic | Inelastic |
| Layer containing metal oxide particles | Yes | Yes | Yes | Yes | Yes | Yes | Yes | Yes |
| Plasticizer in the innermost layer | No | No | No | No | No | No | No | No |
| Ink receptacle layer structure (multiple film layers) | Yes | Yes | Yes | Yes | Yes | Yes | Yes | Yes |

TABLE 1-continued

|  |  |  |  |  |  |  |  |  |
|---|---|---|---|---|---|---|---|---|
| Ink receptacle layer structure (air layer) | Yes | Yes | Yes | Yes | Yes | Yes | Yes | Yes |
| Prolonged exposure to high temperature (14 days at 60° C.) | A | A | A | A | A | A | A | A |
| Poor ejection | A | A | A | B | C | B | A | B |
| Bleed at image edges | A | A | A | A | A | A | A | A |
| Solid image uniformity | A | A | A | A | A | A | A | A |

TABLE 2

|  | Example 17 | Example 18 | Example 19 | Example 20 | Example 21 | Example 22 | Example 23 | Example 24 |
|---|---|---|---|---|---|---|---|---|
| Pigment dispersion A: Red | 5 | 5 | 5 | 5 | 5 | 5 | 5 | 5 |
| Pigment dispersion B: Green | — | — | — | — | — | — | — | — |
| Pigment dispersion C: Orange | — | — | — | — | — | — | — | — |
| Pigment dispersion D: Violet | — | — | — | — | — | — | — | — |
| Pigment dispersion E: Cyan | — | — | — | — | — | — | — | — |
| Pigment dispersion F: Magenta | — | — | — | — | — | — | — | — |
| Pigment dispersion G: Yellow | — | — | — | — | — | — | — | — |
| Pigment dispersion H: Black | — | — | — | — | — | — | — | — |
| Resin dispersion: Urethane resin | 6 | 6 | 6 | 6 | 6 | 6 | 6 | 6 |
| Glycerol | 6 | 6 | 6 | 6 | 6 | 6 | 6 | 6 |
| Trimethylolpropane | 8 | 8 | 8 | 8 | 8 | 8 | 8 | 8 |
| Triethylene glycol | 5 | 5 | 5 | 5 | 5 | 5 | 5 | 5 |
| EDTA | 0.1 | 0.1 | 0.1 | 0.1 | 0.1 | 0.1 | 0.1 | 0.1 |
| Inorganic alkali | 0.1 | 0.1 | 0.1 | 0.1 | 0.1 | 0.1 | 0.1 | 0.1 |
| Surfactant A1 | 1 | 1 | 1 | 1 | 1 | 1 | 1 | 1 |
| Surfactant A2 | — | — | — | — | — | — | — | — |
| Surfactant A3 | — | — | — | — | — | — | — | — |
| Surfactant B1 | 0.5 | 0.5 | 0.5 | 0.5 | 0.5 | 0.5 | 0.5 | 0.5 |
| Surfactant B2 | — | — | — | — | — | — | — | — |
| Purified water | 68.3 | 68.3 | 68.3 | 68.3 | 68.3 | 69.7 | 69.7 | 69.7 |
| Average particle diameter: undiluted analysis | 280 nm | 290 nm | 300 nm | 280 nm | 290 nm | 290 nm | 280 nm | 300 nm |
| Ink receptacle inner bag capacity (L) | 10 | 10 | 10 | 10 | 10 | 3 | 10 | 10 |
| Gas phase volume (mL) | 10 | 50 | 80 | 100 | 110 | 30 | 30 | 30 |
| Gas phase volume/inner bag capacity ratio | 0.001 | 0.005 | 0.008 | 0.01 | 0.011 | 0.01 | 0.003 | 0.003 |
| Receptacle innermost layer | Polyethylene | Polyethylene | Polyethylene | Polyethylene | Polyethylene | Polyethylene | Polyethylene | Polyethylene |
| Ink receptacle inner bag surface area (cm$^2$) | 3850 | 3850 | 3850 | 3850 | 3850 | 1750:3L | 3850 | 3850 |
| Ink receptacle's elasticity | Inelastic | Inelastic | Inelastic | Inelastic | Inelastic | Inelastic | Elastic | Inelastic |
| Layer containing metal oxide particles | Yes | Yes | Yes | Yes | Yes | Yes | Yes | No |
| Plasticizer in the innermost layer | No | No | No | No | No | No | No | No |
| Ink receptacle layer structure (multiple film layers) | Yes | Yes | Yes | Yes | Yes | Yes | Yes | Yes |
| Ink receptacle layer structure (air layer) | Yes | Yes | Yes | Yes | Yes | Yes | Yes | Yes |
| Prolonged exposure to high temperature (14 days at 60° C.) | A | A | A | A | A | A | A | A |
| Poor ejection | B | A | A | A | B | A | B | B |
| Bleed at image edges | A | A | A | A | A | A | A | A |
| Solid image uniformity | A | A | A | A | A | A | A | A |

|  | Example 25 | Example 26 | Example 27 | Example 28 | Comparative Example 1 | Comparative Example 2 | Comparative Example 3 | Comparative Example 4 |
|---|---|---|---|---|---|---|---|---|
| Pigment dispersion A: Red | 5 | 5 | 5 | 5 | 5 | 5 | 5 | 5 |
| Pigment dispersion B: Green | — | — | — | — | — | — | — | — |
| Pigment dispersion C: Orange | — | — | — | — | — | — | — | — |
| Pigment dispersion D: Violet | — | — | — | — | — | — | — | — |
| Pigment dispersion E: Cyan | — | — | — | — | — | — | — | — |
| Pigment dispersion F: Magenta | — | — | — | — | — | — | — | — |
| Pigment dispersion G: Yellow | — | — | — | — | — | — | — | — |
| Pigment dispersion H: Black | — | — | — | — | — | — | — | — |
| Resin dispersion: Urethane resin | 6 | 6 | 6 | 6 | 6 | 6 | 6 | 6 |
| Glycerol | 6 | 6 | 6 | 6 | 6 | 6 | 6 | 6 |
| Trimethylolpropane | 8 | 8 | 8 | 8 | 8 | 8 | 8 | 8 |
| Triethylene glycol | 5 | 5 | 5 | 5 | 5 | 5 | 5 | 5 |
| EDTA | 0.1 | 0.1 | 0.1 | 0.1 | 0.1 | 0.1 | 0.1 | 0.1 |
| Inorganic alkali | 0.1 | 0.1 | 0.1 | 0.1 | 0.1 | 0.1 | 0.1 | 0.1 |

TABLE 2-continued

| | | | | | | | | |
|---|---|---|---|---|---|---|---|---|
| Surfactant A1 | 1 | 1 | 1 | 1 | 0 | 1 | 0 | 1 |
| Surfactant A2 | — | — | — | — | — | — | — | — |
| Surfactant A3 | — | — | — | — | — | — | — | — |
| Surfactant B1 | 0.5 | 0.5 | 0.5 | 0.5 | 0 | 0 | 0.5 | 0.5 |
| Surfactant B2 | — | — | — | — | — | — | — | — |
| Purified water | 69.7 | 69.7 | 69.7 | 68.3 | 69.8 | 68.8 | 69.3 | 68.3 |
| Average particle diameter: undiluted analysis | 290 nm | 290 nm | 300 nm | 290 nm | 290 nm | 290 nm | 300 nm | 280 nm |
| Ink receptacle inner bag capacity (L) | 10 | 10 | 10 | 10 | 10 | 10 | 10 | 10 |
| Gas phase volume (mL) | 30 | 30 | 30 | 30 | 30 | 30 | 30 | 1 |
| Gas phase volume/inner bag capacity ratio | 0.003 | 0.003 | 0.003 | 0.003 | 0.003 | 0.003 | 0.003 | 0.0001 |
| Receptacle innermost layer | Polyethylene | Polyethylene | Polyethylene | PET | Polyethylene | Polyethylene | Polyethylene | Polyethylene |
| Ink receptacle inner bag surface area (cm$^2$) | 3850 | 3850 | 3850 | 3850 | 3850 | 3850 | 3850 | 3850 |
| Ink receptacle's elasticity | Inelastic | Inelastic | Inelastic | Inelastic | Inelastic | Inelastic | Inelastic | Inelastic |
| Layer containing metal oxide particles | Yes | Yes | Yes | Yes | Yes | Yes | Yes | Yes |
| Plasticizer in the innermost layer | Yes | No | No | No | No | No | No | No |
| Ink receptacle layer structure (multiple film layers) | Yes | No | Yes | Yes | Yes | Yes | Yes | Yes |
| Ink receptacle layer structure (air layer) | Yes | Yes | No | Yes | Yes | Yes | Yes | Yes |
| Prolonged exposure to high temperature (14 days at 60° C.) | C | A | C | D | A | A | A | A |
| Poor ejection | B | B | B | B | E | D | D | D |
| Bleed at image edges | A | A | A | A | B | D | B | B |
| Solid image uniformity | A | A | A | A | D | B | D | A |

2.2. Measurement of the Particle Size Distribution of the Inks

The particle size distribution of each ink obtained was measured using HORIBA, Ltd.'s "LA-960" (trade name) laser diffraction/scattering particle size analyzer. To be more specific, undiluted analysis was performed; the ink under test was transferred undiluted, or as freshly prepared, using a syringe to a high-concentration and low-viscosity cell having an optical path length of 1 μm, and measurement was performed with the ink filling the cell uniformly. The average particle diameter obtained represents the median diameter by volume D50.

2.3. Production of Ink Receptacles and Filling with the Inks

Ink receptacles as illustrated in FIG. 1 were produced to have the capacity, innermost layer, and layer structure specified in Table 1 or 2 and filled with the inks obtained in 2.1. Before being packed, the inks were vacuum-degassed using a degassing module connected with a vacuum pump to a dissolved nitrogen concentration of 5 ppm or less. The volume of gas phase in the ink receptacles was controlled to the value specified in Table 1 or 2 by pushing down the ink receptacle filled with the ink with hands to guide residual bubbles to the ink outlet and thereby adjusting the volume of residual bubbles going out through the ink outlet.

The elasticity of the ink receptacles was checked according to JIS-Z-0238 "Testing methods for heat sealed flexible packages," or based on whether the ink receptacle elastically deformed in a constant-rate-of-elongation tensile test. An ink receptacle was assessed as elastic if it elastically deformed, and inelastic if it did not elastically deform.

2.4. Testing

2.4.1. Prolonged Exposure to a High Temperature

The ink receptacles obtained in 2.3, with ink packed therein, were left at 60° C. for 14 days and then allowed to cool at ordinary temperature. After the ink receptacles cooled to ordinary temperature, the ink packed in each receptacle was extracted, and 10 ml was gently placed in drops on a 10-μm-mesh filter and vacuum-filtered. The ink solid left on the filter was thoroughly washed with 50 ml of ion-exchanged water with continued vacuum filtration. After the washing, the residue on the filter was observed under a magnifying glass, and the number of residual particles (number of coarse particles) was counted and graded according to the evaluation criteria below.

Evaluation Criteria

A: No visible coarse particle is observed after 14 days of exposure to 60° C.

B: One to ten coarse particles after 14 days of exposure to 60° C.

C: More than ten coarse particles after 14 days of exposure to 60° C.

2.4.2. Poor Ejection

Using a Seiko Epson Corporation "LX-10000F" ink jet printer modified to print continuous documents, a continuous solid image was formed on continuous paper: product number "C34SB003" with the image density set to maximum. Immediately after 60 seconds of continuous formation of the solid image, a nozzle check pattern was printed for each color, and the number of defective nozzles was counted out of 160 nozzles per color visually and under a magnifying glass. This was repeated three times, and the average number of defective nozzles was calculated and graded according to the evaluation criteria below. An ejection grade of C or better means that the ink receptacle benefited from the advantages of an aspect of the present disclosure.

Evaluation Criteria

A: The number of defective nozzles is 1 or less.

B: The number of defective nozzles is 5 or less and more than 1.

C: The number of defective nozzles is 10 or less and more than 5.

D: The number of defective nozzles is 100 or less and more than 10.

E: The number of defective nozzles is more than 100.

2.4.3. Bleed at Image Edges

Using a Seiko Epson Corporation "LX-10000F" ink jet printer modified to print continuous documents, 1-inch-square solid images were formed in colors on continuous paper: product number "C34SB003," and then vertically crossing black lines in the middle of the images. The black-line images were visually inspected for bleeding. On a solid image in black, the vertically crossing lines in the middle of it was formed in color. The maximum length of the observed bleed was measured using a ruler and graded according to the evaluation criteria below.

Evaluation Criteria

A: No visible bleed is observed at the edges of the images.

B: The bleed involves less than 10% and 0% or more of the total area of the images.

C: The bleed involves less than 50% and 10% or more of the total area of the images.

D: The bleed involves less than 100% and 50% or more of the total area of the images.

E: The bleed is throughout the images.

2.4.4. Solid Image Uniformity

Using a Seiko Epson Corporation "LX-10000F" ink jet printer modified to print continuous documents, a continuous solid image was formed on continuous paper: product number "C34SB003" with the image density set to standard. The formed solid image was inspected for completeness under a magnifying glass and visually and graded according to the evaluation criteria below.

Evaluation Criteria

A: The solid image has no visible missing dot even under a magnifying glass.

B: Missing dots in the solid image are observed under a magnifying glass but not visually.

C: Missing dots in the solid images are observed visually.

2.5. Test Results

In the Comparative Examples, prolonged exposure to a high temperature produced no visible coarse particles, but many nozzles went defective throughout. By contrast, in the Examples, few nozzles went defective.

In Examples 1 and 4 to 10, prolonged exposure to a high temperature produced no visible coarse particles, and few nozzles went defective with whatever pigment. Example 1 experienced some bleeding at image edges because the pigment in the ink had a larger average particle diameter than the other pigments. According to Examples 2 and 3, increasing the percentage of surfactant B1, an antifoaming surfactant having an HLB smaller than 9, resolved the issue of bleeding at image edges, but according to Example 3, too high a percentage of surfactant B1 slightly affected the grade in solid image uniformity.

According to Examples 1, 11, and 12, switching between surfactants A, highly wetting surfactants having an HLB of 11 or more, did not change the results, but too high an HLB of the surfactant A slightly affected ejection stability. According to Examples 1 and 13, too high an HLB of the surfactant B also affected ejection stability.

From Examples 1 and 14 to 22, it was shown that the number of nozzles that go defective depends on the volume of gas phase relative to the capacity of the inner bag of the ink receptacle.

According to Examples 1 and 23 to 28, the materials forming the ink receptacle were also relevant to ejection stability. In Example 23, the ink receptacle was made of elastic urethane. This made the receptacle somewhat inferior in gas barrier properties, resulting in slightly more defective nozzles. In Example 24, there was no layer containing metal oxide particles. This made the ink receptacle inferior in gas barrier properties, resulting in slightly more defective nozzles. In Example 25, the innermost layer contained a plasticizer. The plasticizer dissolved, causing the formation of coarse particles that resulted in slightly more defective nozzles. In Example 26, the receptacle did not have a layer structure, or was not formed by multiple film layers. This made the receptacle inferior in gas barrier properties, resulting in slightly more defective nozzles. In Example 27, the receptacle had no air layer. This caused the plasticizer to dissolve, causing the formation of coarse particles that resulted in slightly more defective nozzles. In Example 28, the inner bag, i.e., the element touching the ink, was not made of polyethylene. This made the inner bag less resistant to chemicals, causing the formation of visible coarse particles that resulted in slightly more defective nozzles.

In Comparative Example 1, in which the ink contained neither a surfactant A, i.e., a surfactant having an HLB of 11 or more, nor a surfactant B, i.e., a surfactant having an HLB of 9 or less, many nozzles went defective, and solid image uniformity was also low. In Comparative Example 2, in which the ink contained no surfactant B, not as many as in Comparative Example 1 yet still a large number of nozzles went defective, solid image uniformity was low, and bleed occurred at image edges. In Comparative Example 3, in which the ink contained no surfactant A, not as many as in Comparative Example 1 yet still a large number of nozzles went defective, and solid image uniformity was low. In Comparative Example 4, in which the volume of gas phase was small, not as many as in Comparative Example 1 yet still a large number of nozzles went defective.

The present disclosure is not limited to the above embodiments, and many variations are possible. For example, the present disclosure embraces configurations substantially identical to those described in the embodiments, e.g., configurations identical in function, methodology, and results to or having the same goal and offering the same advantages as the described ones. The present disclosure also includes configurations created by changing any nonessential part of those described in the above embodiments. Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink receptacle comprising:
   an inner bag filled with an aqueous ink jet ink; and
   a pliable sheath containing the inner bag, wherein:
   the inner bag contains a gas phase in a volume fraction of 0.001 or more relative to a capacity of the inner bag;
   the aqueous ink jet ink contains a dispersed component, an acetylene glycol surfactant having an HLB of 11 or more, and an acetylene glycol surfactant having an HLB of 9 or less, the inner bag has a polyethylene layer as an innermost layer thereof, which forms a surface touching the aqueous ink jet ink, a layer containing metal oxide particles, and a polyethylene layer, in order from innermost, the sheath has a polyethylene layer, a layer containing metal oxide particles, and a polyethylene layer, in order from the innermost, and an air layer is between the inner bag and the sheath.

2. The ink receptacle according to claim 1, wherein the inner bag contains the gas phase in a volume of 10 mL or more under conditions of 23° C. and 1 atm.

3. The ink receptacle according to claim 1, wherein the inner bag contains the gas phase in a volume of 100 mL or less under conditions of 23° C. and 1 atm.

4. The ink receptacle according to claim 1, wherein the inner bag has a capacity of 1 L or more.

5. The ink receptacle according to claim 1, wherein: the inner bag is a film at least in part.

6. The ink receptacle according to claim 5, wherein the film has the layer containing metal oxide particles.

7. The ink receptacle according to claim 5, wherein the film has the polyethylene layer as the innermost layer, the layer containing metal oxide particles, and the polyethylene layer, in order from innermost.

8. The ink receptacle according to claim 5, wherein the polyethylene layer contains no plasticizer.

9. The ink receptacle according to claim 1, wherein the dispersed component has an average particle diameter of 50 nm or more and 800 nm or less.

10. The ink receptacle according to claim 1, wherein: the aqueous ink jet ink contains at least one pigment as the dispersed component; and the pigment is one or more selected from carbon black, C.I. Pigment Blue 15:3, C.I. Pigment Violet 23, C.I. Pigment Red 254, and C.I. Pigment Green 36.

11. The ink receptacle according to claim 1, wherein in the aqueous ink jet ink, a percentage of the acetylene glycol surfactant having an HLB of 11 or more is higher than a percentage of the acetylene glycol surfactant having an HLB of 9 or less.

12. An ink receptacle comprising:
an inner bag filled with an aqueous ink jet ink; and
a pliable sheath containing the inner bag, wherein:
the inner bag has a surface area of 1150 $cm^2$ or more on a surface thereof touching the aqueous ink jet ink;
the aqueous ink jet ink contains a dispersed component, an acetylene glycol surfactant having an HLB of 11 or more, and an acetylene glycol surfactant having an HLB of 9 or less,
the inner bag has a polyethylene layer as an innermost layer thereof, which forms a surface touching the aqueous ink jet ink, a layer containing metal oxide particles, and a polyethylene layer, in order from innermost,
the sheath has a polyethylene layer, a layer containing metal oxide particles, and a polyethylene layer, in order from innermost, and
an air layer is between the inner bag and the sheath.

13. An ink receptacle comprising:
an inner bag filled with an aqueous ink jet ink; and
a pliable sheath containing the inner bag, wherein:
a capacity of the inner bag is 1 L or more and 50 L or less;
the inner bag contains 10 mL or more of a gas phase under conditions of 23° C. and 1 atm;
the aqueous ink jet ink contains a dispersed component, an acetylene glycol surfactant having an HLB of 11 or more, and an acetylene glycol surfactant having an HLB of 9 or less,
the inner bag has a polyethylene layer as an innermost layer thereof, which forms a surface touching the aqueous ink jet ink, a layer containing metal oxide particles, and a polyethylene layer, in order from innermost,
the sheath has a polyethylene layer, a layer containing metal oxide particles, and a polyethylene layer, in order from innermost, and
an air layer is between the inner bag and the sheath.

* * * * *